United States Patent
Morie

(10) Patent No.: US 7,042,370 B2
(45) Date of Patent: May 9, 2006

(54) NAVIGATION DEVICE

(75) Inventor: Nobuhide Morie, Iwaki (JP)

(73) Assignee: Alpine Electronics, Inc., (JP)

( * ) Notice: Subject to any disclaimer, the term of this patent is extended or adjusted under 35 U.S.C. 154(b) by 125 days.

(21) Appl. No.: 10/751,393

(22) Filed: Jan. 5, 2004

(65) Prior Publication Data

US 2004/0183700 A1    Sep. 23, 2004

(30) Foreign Application Priority Data

Jan. 6, 2003    (JP) .............................. 2003-000623

(51) Int. Cl.
*G08G 1/123*    (2006.01)

(52) U.S. Cl. .............................. 340/995.14; 340/995.1; 340/995.19; 340/995.24; 340/988; 340/990; 701/200; 701/208

(58) Field of Classification Search ..............................
340/995.14–995.16, 995.1, 995.17, 995.19, 340/995.24, 988, 990; 701/200, 201, 207, 701/208, 211, 209, 212

See application file for complete search history.

(56) References Cited

U.S. PATENT DOCUMENTS

| 6,643,585 | B1 * | 11/2003 | McGovern | 701/211 |
| 6,836,723 | B1 * | 12/2004 | de Silva | 701/200 |
| 6,859,723 | B1 * | 2/2005 | Yokota | 701/201 |
| 2001/0044694 | A1 | 11/2001 | Ukita | |

FOREIGN PATENT DOCUMENTS

JP    08-190343    7/1996

\* cited by examiner

*Primary Examiner*—Hung Nguyen
(74) *Attorney, Agent, or Firm*—Brinks Hofer Gilson & Lione

(57) ABSTRACT

A navigation device in which, in accordance with a scrolling instruction given by a user during display on a first screen, a map image is scrolled along a road on which a vehicle position mark is positioned up to a position in a second screen in which a next main intersection is situated at the center of the screen. Regardless of whether a guide route is set, the map image can be scrolled along the road, and the scrolling is stopped at a main intersection that the user wants to confirm.

11 Claims, 3 Drawing Sheets

SCREEN 1
(POSITION 1)

SCREEN 2
(POSITION 2)

NAVIGATION DEVICE

BACKGROUND OF THE INVENTION

1. Field of the Invention

The present invention relates to a vehicle navigation device that allows a driver to easily reach a predetermined destination by guiding the vehicle to the destination. More particularly, the present invention relates to a suitable navigation device having the function of scrolling a map image by a user operation.

2. Description of the Related Art

In general, in a navigation device for guiding a vehicle, for example, a self-contained navigation sensor and a global positioning system (GPS) receiver are used to detect the present position of the vehicle. Then, map data of an area near the detected present position is read out from a recording medium (such as a DVD), a map image is plotted on a display device, and a vehicle position mark is superimposed and plotted on a predetermined position of the map image. In accordance with changes in the present position of the vehicle due to the movement of the vehicle, the vehicle position mark is moved on a screen, or the vehicle position mark is fixed at a predetermined position on the screen and an area of a map image near the predetermined position is scrolled, so that the user can know the present position of the vehicle at a glance.

Almost all recent navigation devices have a route guide function that allows a driver to easily drive to a predetermined destination without taking a wrong route. In the route guide function, using map data, the least expensive route connecting the place of departure to the destination is automatically searched as a result of simulation by breadth-first search (BFS) or a Dijkstra method. The searched guide route is plotted heavily with a color that is different from the other roads on a map screen while driving. When the vehicle moves within a certain distance of a guide intersection on the guide route, the driver is guided to the intersection by being informed of the direction of travel by a voice or by an arrow indicating the direction of travel after enlarging and displaying a guide image of the intersection.

In this type of navigation device, it is possible for the user to scroll a map displayed on the screen in any direction by displaying a cursor on a navigation screen by operating an operation section, such as a touch panel or a remote controller. In other words, when, with the cursor being fixedly displayed at a predetermined location on the screen, the user operates the operation section to move the cursor, the map on the screen is scrolled in accordance with the movement of the cursor.

Such a screen scrolling operation using a cursor is carried out, for example, to search for a predetermined point of interest on the map screen or to give an instruction to the navigation device body for using a point where the cursor is located for various functions (such as for setting a destination or a route along the way by route searching or for indicating the present position). The screen scrolling is often carried out when the user is trying to ascertain beforehand the road or roads ahead while driving.

However, when the driver performs screen scrolling while driving, the driver cannot pay full attention to his/her driving because he or she must perform the screen scrolling while steadily looking at the map screen. As one means for solving this problem, the function of automatic scrolling along a set guide route is generally used. As another means for solving this problem is disclosed in Japanese Unexamined Patent Application Publication No. 8-190343, in which the function of allowing scrolling of a map along a route is accomplished by selecting a road scroll mode and by operating a joystick.

In general, a driver tends to drive his/her vehicle based on the location of a nearby main road. For example, the driver tends to think of turning to the right at a certain corner because a certain street is situated ahead. For this reason, it is very important for the driver to safely and reliably find an intersection that joins a main road by screen scrolling even while driving.

However, the related function of screen scrolling along a guide route cannot be used when a guide route is not set. In addition, even if a guide route is set, screen scrolling is performed automatically along a set guide route, thereby making it impossible to confirm a main road that is not situated on the guide route.

In the related art disclosed in Japanese Unexamined Patent Application Publication No. 8-190343, because screen scrolling is performed along a road, the user can relatively easily operate the cursor when a road is bent. However, in order to ascertain a predetermined main road, it is nonetheless necessary to scroll a map on the screen while steadily looking at the map screen. Therefore, the driver still cannot pay full attention to his/her driving.

SUMMARY OF THE INVENTION

Accordingly, it is an object of the present invention to make it possible for a user to safely and reliably ascertain any junction point by scrolling on a screen while driving a vehicle regardless of whether a guide route is set.

In order to overcome the aforementioned problems, a navigation device is provided in which, when a user sets a scrolling direction by operating an operating means, a map image is scrolled in the set direction along a road on which a vehicle position marker is located up to a predetermined position (such as an intersection which joins a main route, an expressway entrance, exit, or junction), and is stopped there.

According to a preferred embodiment of the present invention having such a structure, the user sets a direction once in order for the map image to be automatically scrolled along the road where the vehicle position mark is located up to, for example, the next intersection, and to be stopped there. When the user subsequently sets a direction, the map image is scrolled from that position where the scrolling has stopped up to, for example, a next intersection along the road, and is stopped there. This makes it possible to successively ascertain, for example, neighboring intersections with reference to the position of one's vehicle only by a simple operation. In addition, because the scrolling is automatically stopped at, for example, an intersection that the user wants to ascertain, it becomes unnecessary to steadily watch the screen all the time after setting a direction.

In accordance with a scrolling instruction given by the user, the map image is scrolled along a road on which one's vehicle is located up to a predetermined position. Regardless of whether a guide route is set, it is possible to successively ascertain, for example, neighboring intersections with reference to the position of one's vehicle only by a simple operation, and to safely and reliably confirm any main intersection by scrolling even while driving.

DESCRIPTION OF THE PREFERRED EMBODIMENTS

Figure 1:
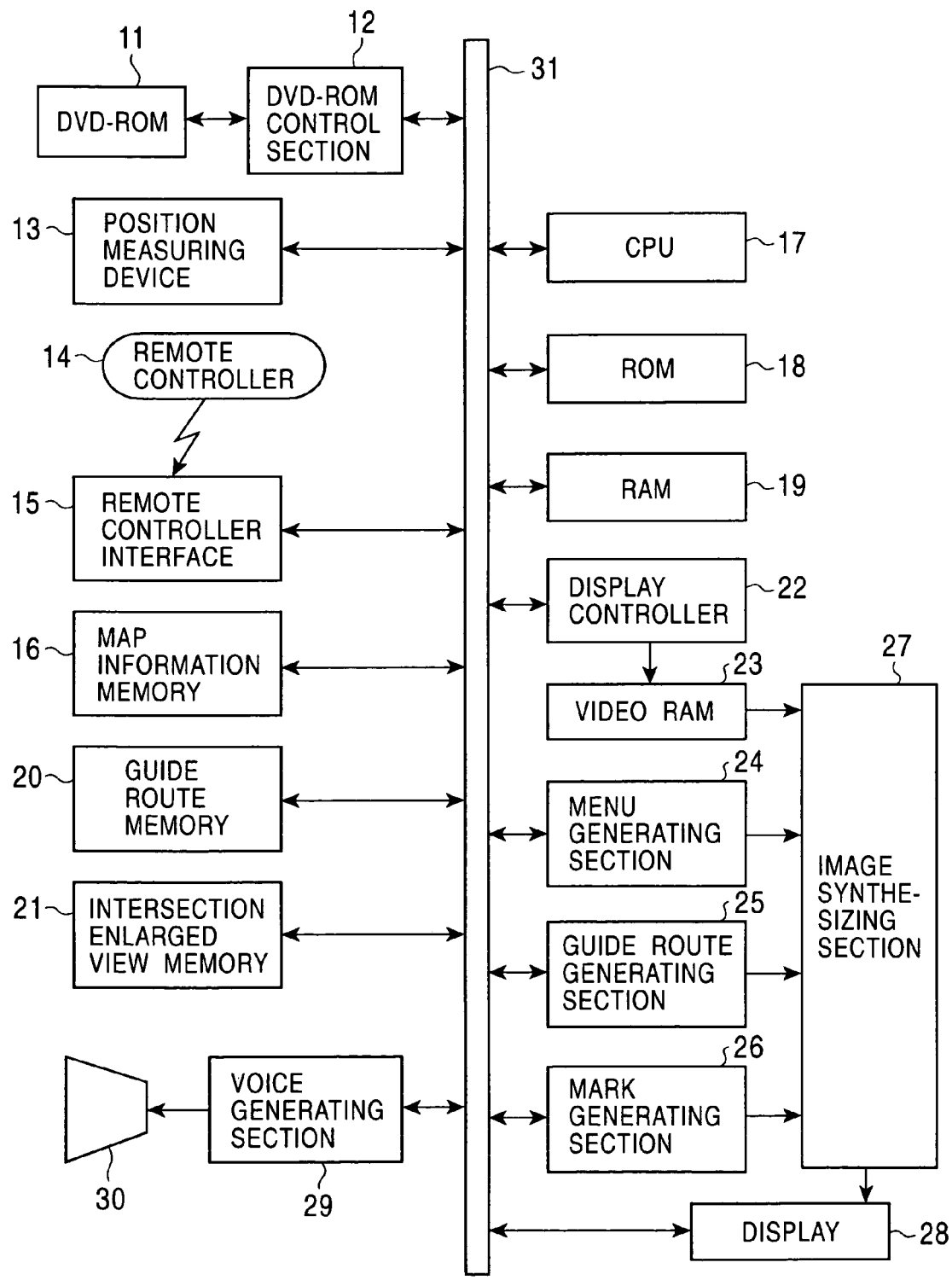
FIG. 1 is a block diagram of a preferred embodiment of the present invention.

FIG. 1 is a block diagram of an example of an overall structure of a navigation device of an embodiment of the present invention. FIG. 2 shows a state of scrolling on a navigation screen in the embodiment. A feature of the embodiment will be described with reference to FIG. 2.

Figure 2B:
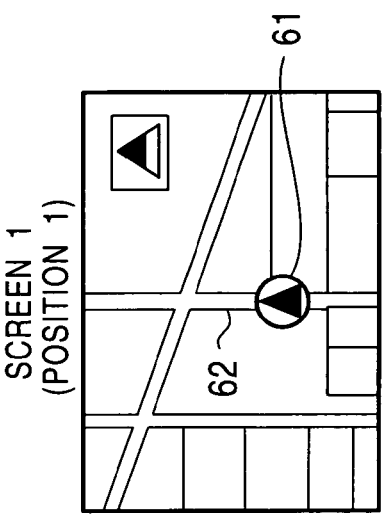
FIG. 2 shows an example of screen scrolling in accordance with a preferred embodiment of the present invention.
Figure 2C:
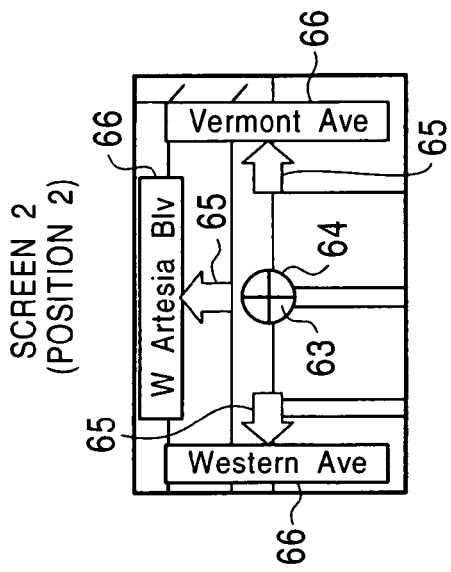
Figure 2A:
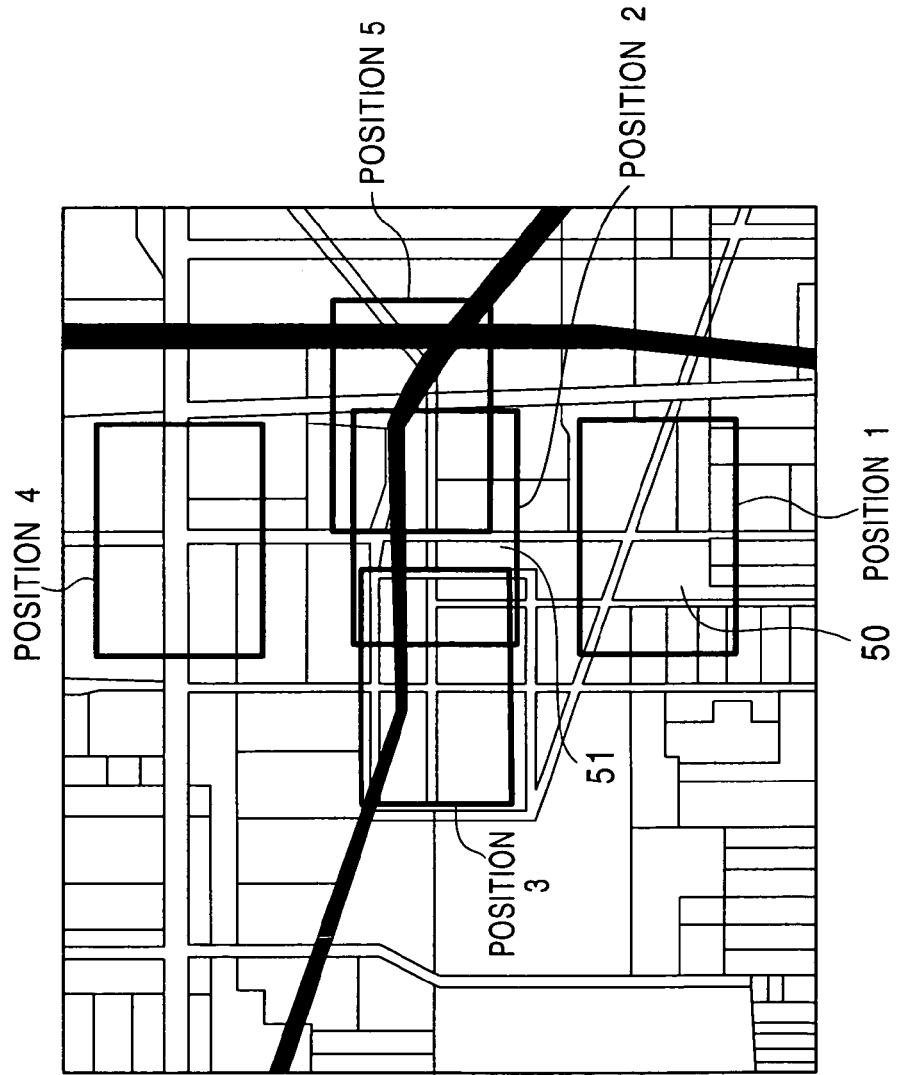

FIG. 2A is a conceptual view of a portion of map data in the navigation device. In general, in the navigation device, a rectangular area of a predetermined size is detached from a huge map data area and is displayed on a screen. For example, at a certain point in time when a vehicle is traveling, a rectangular area 50 of position 1 corresponding to the present position of the vehicle is detached, and is displayed as shown on a screen 1 shown in FIG. 2B.

At this time, when a user, for example, tilts a joystick upward to perform scrolling on the screen in the upward direction, a map image is gradually scrolled in a direction set by the user along a road 62 on which a vehicle position mark 61 is located up to an intersection 63 which joins a next main road (hereinafter referred to as the "main intersection 63"). Then, the scrolling is stopped when the main intersection 63 comes to substantially the center of the screen. Here, a position 2 area that is detached from the map data area is represented as a rectangular area 51 in FIG. 2A, and a screen 2 corresponding thereto is shown in FIG. 2C.

On the screen after scrolling shown in FIG. 2C, a scroll mark 64 with a predetermined shape is displayed on the main intersection 63 instead of the vehicle position mark 61. In addition, with the main intersection 63 as a starting point, the next travelable directions are indicated by a plurality of arrows 65, and names 66 of main intersections ahead on roads connected to the main intersection 63 in the travelable directions are displayed on the screen.

When, at the main intersection 63, the user operates the joystick again and sets a scroll direction, the map image is scrolled along the corresponding road from the main intersection 63, and is stopped again at the corresponding next main intersection ahead. In other words, with the scroll mark 64 being displayed, when the user tilts the joystick to the left, upward, or to the right, the map image is scrolled to a position 3, a position 4, or a position 5, respectively, as shown in FIG. 2A, along the road up to the corresponding main intersection. When the joystick is tilted downward from the state shown in FIG. 2C, the map of the original present position is displayed again as shown in FIG. 2B.

The screen scrolling is carried out in accordance with a display mode that is selected at a certain time. In other words, when a north-up mode in which the upper side of the display is north is selected, the map image during and after the scrolling is also displayed in the north-up mode. When a heading-up mode in which the upper side of the display is always defined as the direction of travel is selected, the map display during and after the scrolling is displayed in the heading-up mode. Hereunder, the aforementioned function characteristic of the embodiment of scrolling to a next main intersection ahead along a road on which the vehicle is located will be called the "intersection scroll function."

Here, the term a "main road" refers to a road that is of a predetermined rank or above in road classification. For example, the roads in Japan are classified in order of decreasing rank as follows: (1) national expressways, (2) urban expressways, (3) ordinary national highways, (4) principal local roads, (5) designated city roads, (6) ordinary prefectural roads, (7) principal ordinary roads, (8) ordinary roads, (9) narrow roads, (10) ferry sea routes, (11) cart lanes, and (12) others. In the embodiment, roads of, for example, rank 4 (principal local roads) and above are classified as main roads.

In the United States, the Navigation Technologies Road Network comprises five function classes, FC1 to FC5. Super highways are classified as FC1, highways are classified as FC2, collector roads are classified as FC3, feeder roads are classified as FC4, and local streets are classified as FC5. Roads of, for example, FC3 (collector roads) and above are classified as main roads.

In FIG. 1, reference numeral 11 denotes a map recording medium, such as a DVD-ROM, which stores various pieces of map data required for, for example, displaying a map or searching for a route. Although the DVD-ROM 11 is used as a recording medium for storing map data, other recording media, such as a CD-ROM or a hard disk, may also be used. Reference numeral 12 denotes a DVD-ROM control section for controlling reading of the map data from the DVD-ROM 11.

The pieces of map data that are recorded in the DVD-ROM 11 are controlled by being hierarchized into levels. Upper level map data provides a map for viewing a wide area. Lower level map data provides a detailed map of a narrow area. The levels are indicated by rectangular areas that are called sections that are divided according to predetermined latitudes and longitudes. The map data of each section can be identified by specifying a section number and read out.

The pieces of map data corresponding to the sections each comprise a plotting unit comprising various pieces of data required for a map display; a road unit comprising data required for various processing operations, such as map matching, route searching, and route guiding; and an intersection unit comprising various pieces of detailed intersection data. Of these units, the plotting unit comprises background layer data and character layer data. The background layer data is required for displaying, for example, a building or a river. The character layer data is required for displaying, for example, the name of a city, town, or village or the name of a road.

The road unit includes a connection node table and a link table. The connection node table includes pieces of detailed data of nodes corresponding to points where roads intersect, such as intersections and junction points. The link table includes pieces of detailed data of links corresponding to, for example, roads or traffic lanes in order to connect a node on a road and another node adjacent thereto.

Information such as link bearings and types of roads according to existing links is recorded in the link table. The link bearing is indicated by an angle that is formed clockwise from 0 (defined as true north) in 256 sections. The road type tells the road class of an actual road corresponding to the link. Accordingly, by looking at the link bearing, the user can scroll a map in the direction of the road. By looking at the route type, the user can know whether or not an intersecting road is a main road.

Reference numeral 13 denotes a position measuring device for measuring the present position of a vehicle. The position measuring device comprises, for example, a self-contained navigation sensor, a GPS receiver, and a position calculation central processing unit (CPU). The self-contained navigation sensor comprises a speed sensor (distance sensor) and an angular speed sensor (relative bearing sensor). The speed sensor detects the distance of travel of the vehicle by outputting one pulse every time the vehicle covers a predetermined distance. The angular sensor is, for example, a vibrating gyroscope for detecting the angle of rotation (movement bearing) of the vehicle. The self-contained navigation sensor detects the relative position and bearing of the vehicle by the speed sensor and the angular speed sensor.

The position calculation CPU calculates the absolute position of the vehicle (estimated position of the vehicle) and the bearing of the vehicle based on the relative position and bearing data of the vehicle output from the self-contained navigation sensor. The GPS receiver receives radio waves from GPS satellites by a GPS antenna, and calculates the absolute position and bearing of the vehicle by three-dimensional or two-dimensional measurements. (The bearing of the vehicle is calculated based on the position of the vehicle at the present time and the position of the vehicle prior to the present time by one sampling time ΔT.)

Reference numeral 14 denotes an operation section, such as a remote controller, which comprises various operating devices (such as buttons and a joystick) for allowing the user to set various pieces of information (such as destination of route guiding or ON/OFF state of the intersection scroll function) with respect to the navigation device and for carrying out various operations (such as menu selection, enlarging/contracting operation, manual map scrolling, and number input). Reference numeral 15 denotes a remote controller interface for receiving an infrared signal corresponding to the state of operation of the remote controller 14 from the remote controller 14.

Reference numeral 16 denotes a map information memory which temporarily stores map data read out from the DVD-ROM 11 by a controlling operation of the DVD-ROM control section 12. More specifically, the DVD-ROM control section 12 inputs information of the present position of the vehicle from the position measuring device 13 and outputs an instruction for reading out map data of a predetermined range including the present position of the vehicle. By this, map data that is required to search for a guide route or that is required for a map display is read out from the DVD-ROM 11 and stored in the map information memory 16.

When an instruction for scrolling a map image is given as a result of operating the remote controller 14, the DVD-ROM control section 12 outputs an instruction for reading out a map data of a predetermined range including a scroll position (illustrated with reference to FIG. 2) in accordance with an instruction from a processor (CPU) 17 to which information regarding the operation of the remote controller 14 has been input. By this, map data required for a map display in accordance with the scrolling is read out from the DVD-ROM 11 as required and stored in the map information memory 16.

The CPU 17 controls the entire navigation device. Reference numeral 18 denotes ROM for storing various programs (such as a guide route search program and an intersection scroll program). Reference numeral 19 denotes RAM for temporarily storing data obtained when various processing operations are being carried out and data obtained as a result of these various processing operations. In accordance with the guide route search program stored in ROM 18, the CPU 17, for example, searches for the least expensive guide route connecting the present position to a destination using the map data stored in the map information memory 16.

The CPU 17 controls scrolling of a map image on the screen in accordance with the intersection scroll program stored in ROM 18. More specifically, when the intersection scroll function is on and the remote controller 14 sets a scroll direction, the map image is scrolled in the set direction along a road on which the vehicle is located up to a next main intersection. Here, the scroll direction is determined in accordance with link bearing information included in the map data stored in the map information memory 16, and a determination is made as to whether an intersection is the next main intersection according to road classification information.

When, as scrolling is carried out, the map information memory 16 runs out of information required as map data for subsequent scrolling, the CPU 17 gives an instruction to the DVD-ROM control section 12 as required in order to read out map data required for map display for subsequent scrolling and to store this map data in the map information memory 16.

Reference numeral 20 denotes a guide route memory for storing guide route data searched by the CPU 17. The guide route data includes the positions of the nodes from the places of departure to the destinations, and an intersection identification flag for indicating whether or not the nodes are intersections.

Reference numeral 21 denotes an intersection enlarged view memory for temporarily storing data of enlarged views of all the guide intersections on a guide route (enlarged views of intersections for guiding the vehicle to the destination, destination, and image of an arrow indicating direction of travel). The data of the enlarged views of the intersections is also read out from the DVD-ROM 11 as required by a controlling operation of the DVD-ROM control section 12.

Reference numeral 22 denotes a display controller for generating map image data required for displaying a map image on a display device 28, based on the map data stored in the map information memory 16. Reference numeral 23 denotes a video RAM for temporarily storing the map image data generated by the display controller 22. In other words, the map image data generated by the display controller 22 is temporarily stored in the video RAM 23, and a portion of the map image data corresponding to one screen is read out and output to an image synthesizing section 27.

Reference numeral 24 denotes a menu generating section for generating and outputting a menu image required when performing various operations using the remote controller 14. Reference numeral 25 denotes a guide route generating section for generating a guide route plotting data using the results of execution of the guide route search program stored in the guide route memory 20. In other words, among the pieces of guide route data stored in the guide route memory 20, data including a map area plotted in the video RAM 23 at the time is selectively read out, and the map area is superimposed on the map image in order to heavily and thickly plot a guide route with a predetermined color. When the vehicle moves within a predetermined distance of a guide intersection that is situated ahead on the guide route, an image of a guide diagram of the intersection that the vehicle is approaching is generated based on the intersection enlarged view data stored in the intersection enlarged view memory 21, and is output.

Reference numeral 26 denotes a mark generating section for generating and outputting, for example, a vehicle position mark that is displayed at the position of one's vehicle after map matching and various landmarks for displaying gasoline stations and convenience stores. The mark generating section 26 also generates the scroll mark 64, the arrows 65 indicating the travelable directions, the next main intersection names 66, etc.

The term "map matching" refers to correcting the position of one's moving vehicle so that it is on a road included in map data using the map data read out at the map information memory 16, the vehicle position and bearing data from the GPS receiver measured by the position measuring device 13, and the estimated vehicle position and vehicle bearing data from the self-contained navigation sensor.

Reference numeral 27 denotes the image synthesizing section for synthesizing various images and outputting the synthesized images. More specifically, the image synthesizing section 27 superimposes the various pieces of image data outputted from the menu generating section 24, the guide route generating section 25, and the mark generating section 26 upon the map image data read out by the display controller 22, synthesizes the pieces of image data and the read-out map image data, and outputs the synthesized images to the display device 28.

By this, as shown in FIG. 2B, a map image of an area near the position of one's vehicle is displayed on the navigation screen of the display device 28 along with the vehicle position mark 61, the various landmarks, etc. In addition, as shown in FIG. 2C, map information during and after scrolling is displayed on the navigation screen along with the scroll mark 64, the arrows 65, the intersection names 66, etc.

Reference numeral 29 denotes a voice generating section for generating, for example, a voice for guiding the user to an intersection or a voice for giving information concerning various operations. Reference numeral 30 denotes a speaker for outputting the voice generated from the voice generating section 29 to the outside. Reference numeral 31 denotes a bus for transmitting and receiving data among the aforementioned various functional parts.

Figure 3:
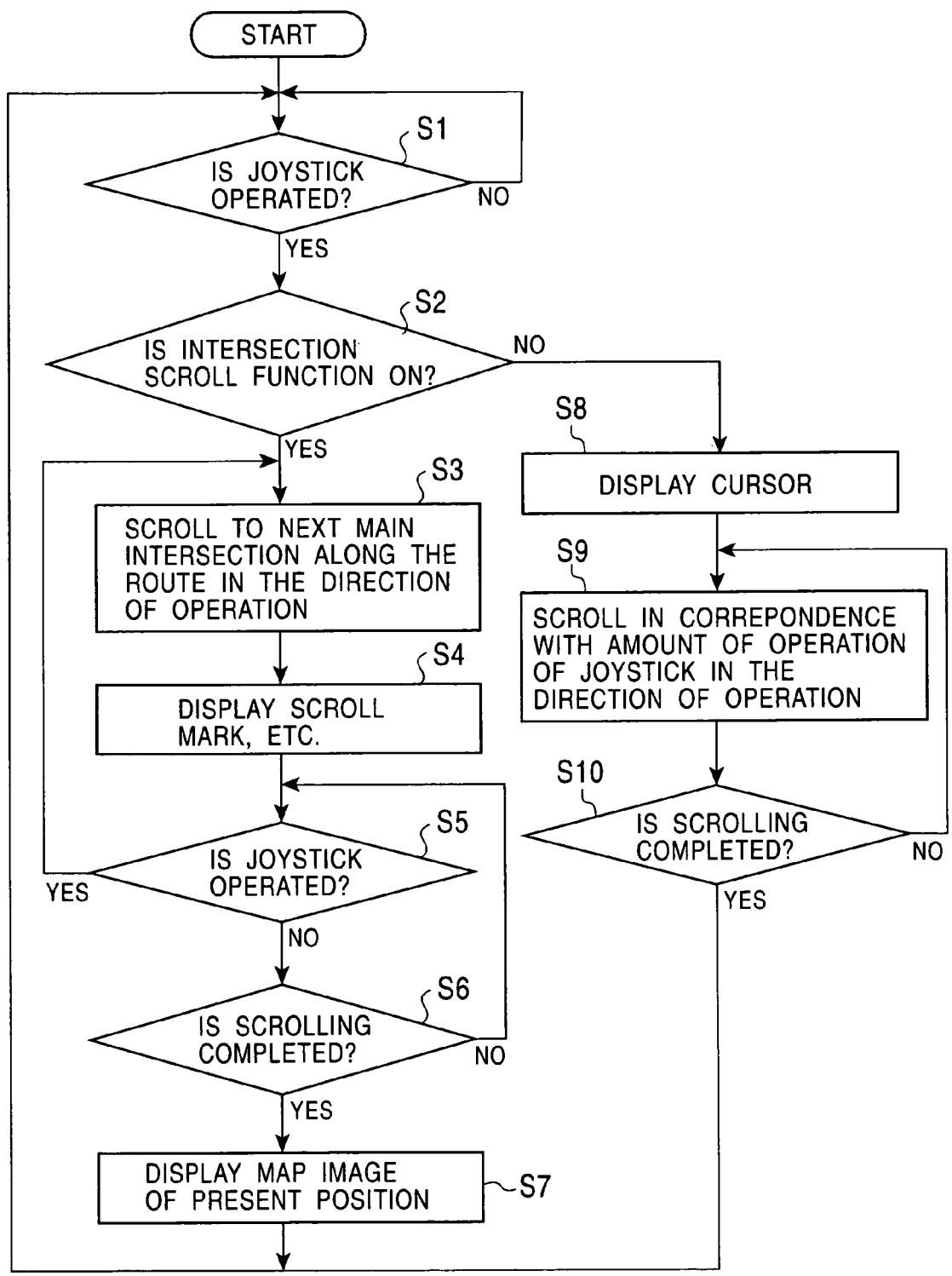
FIG. 3 is a flowchart of an example of a scrolling process in accordance with a preferred embodiment of the present invention.

Next, scrolling on the screen by the navigation device of the embodiment having the aforementioned structure will be described. FIG. 3 is an overall flowchart of the scrolling steps.

Referring to FIG. 3, when the user operates the joystick of the remote controller 14 in act S1, the CPU 17 determines whether the intersection scroll function is set on in act S2. When the function is set on, the CPU 17 gradually scrolls a map image up to a next main intersection along a road on which one's vehicle is located in a direction set by the operation of the joystick in act S3. At this time, in accordance with an instruction from the CPU 17, the display controller 22 successively generates map image data during scrolling using map data stored in the map information memory 16, and outputs the map image data to the video RAM 23.

When scrolling to the next main intersection is completed, the CPU 17 generates an instruction to the mark generating section 26 to display the scroll mark 64, the arrows 65, and the next main intersection names 66, etc., on the screen in act S4. In this state, the CPU 17 determines whether the user has operated the joystick of the remote controller 14 again in act S5. Here, if the CPU 17 determines that the user has operated the joystick in any of the aforementioned directions, the process returns to act S3 to execute the same steps again.

In contrast, if the CPU 17 determines that the user has not operated the joystick, the CPU 17 determines whether the user has performed an operation for completing the scrolling in act S6. To complete the scrolling means to stop the scrolling by, for example, pressing a present position button of the remote controller 14.

If the scrolling is not completed, the process returns to act S5 for continuing a standby state of a joystick operation and a scrolling completion operation. When the scrolling completion operation is executed, the scroll mark 64 and other displayed items disappear from the map image in order to display the map image including the present position in act S7. Then, the process returns to act S1.

When, in act S2, the CPU 17 determines that the intersection scroll function is off, the CPU 17 controls the mark generating section 26 in order to display a cursor on a map on the navigation screen in act S8. Then, the map image is scrolled in the usual manner by an amount corresponding to the amount of operation of the joystick in the direction of operation thereof in act S9.

Thereafter, the CPU 17 determines whether a scroll completion operation has been carried out in act S10. Here, to complete the scrolling operation means to complete various setting operations including setting the cursor at a destination or at a location along the way to the destination in route searching, or to reset such settings along the way by, for example, pressing the present position button of the remote controller 14.

Here, if the CPU 17 determines that the scroll completion operation has not been carried out, the process returns to act S9 in order to continue the scrolling using the cursor. If it determines that the scroll completion operation has been carried out, the cursor on the map image disappears from the map image. Then, the process returns to act S1.

As described in detail above, in the embodiment, the user only needs to tilt the joystick of the remote controller 14 once in a predetermined direction in order to scroll a map image along a road where one's vehicle is located and to automatically stop the scrolling at a next main intersection.

By this, it is possible to perform scrolling along a road even if a guide route is not set. Moreover, it is possible to successively confirm a main intersection near the position of one's vehicle serving as a reference by a simple operation. Because the scrolling is automatically stopped at the main intersection, the screen only needs to be confirmed after the scrolling has stopped, thereby making it unnecessary to look steadily at the screen all the time in order to stop the scrolling at a predetermined intersection. Therefore, even while driving, the user can safely and reliably confirm any main intersection by scrolling.

In the embodiment, since the names of the next main intersections on the roads connected to the intersection reached by the scrolling are also displayed on the screen, it is possible to know beforehand the direction of the main intersections that the user wants to confirm by subsequent scrolling, so that the user can easily find the intersections that he/she wants to confirm by successive scrolling.

The intersection scroll function in the embodiment can be used when the vehicle is traveling along a guide route that is set. For example, even if, in the guide route, a route for turning to the left or right is set at an intersection which joins a non-main route, when the intersection scroll function in the embodiment is used, the map image can be scrolled to the next main intersection after scrolling straight to the intersection at which the vehicle turns to the left or right on the guide route. By this, it is possible to easily confirm other main roads that are not on the guide route. When the guide route is set, even if the intersection at which the vehicle turns to the left or right is not a main intersection, the scrolling may be temporarily stopped there.

Although, in the embodiment, scrolling is performed up to a next intersection after scrolling straight to an intersection which joins a non-main road, the scrolling may be stopped at each intersection. However, in the first place, the user using the navigation device has a strong tendency to take a main road which is easily found because he/she does not know the way. Moreover, displaying intersections of narrow roads may rather confuse the user while driving. Therefore, in order to minimize the number of operations of the user while driving, it is desirable to stop the scrolling only at a main road. A main road may be defined in any way.

Although, in the preferred embodiment, an intersection is given as an example of a place where scrolling stops, the place where the scrolling stops is not limited thereto. For example, the scrolling may be stopped at an expressway or a freeway entrance, exit, or junction. In other words, the user often wants to confirm beforehand in what way an ordinary road is connected to an expressway entrance, exit, or junction. Accordingly, if the scrolling can be stopped at these locations too, it becomes very convenient for the user. It is also possible to arbitrarily determine the position of stopping the scrolling.

Although, in the preferred embodiment, the names of the next main intersections are displayed on the screen, displayed items are not limited thereto. For example, the name of a next main road ahead connected to the main intersection where the vehicle is presently located may be displayed. In addition, a destination reached by taking a road connected to the main intersection where the vehicle is presently located may be displayed.

The described embodiments of the present invention merely represent preferred forms of the present invention in carrying out the invention. Therefore, it is to be understood that these do not limit the technical scope of the present invention. In other words, other preferred forms may be realized without departing from the spirit and distinctive feature of the present invention.

What is claimed is:

1. A navigation device comprising:
   a map displaying means for displaying a map image together with a vehicle position mark on a screen;
   an operating means for setting a scroll direction by a user; and
   a scrolling means for scrolling the map image in the scroll direction set by the user along a road on which the vehicle position mark is located up to a predetermined position.

2. The navigation device of claim 1, wherein the predetermined position is an intersection that joins a main road.

3. The navigation device of claim 1, wherein the predetermined position is any one of an expressway entrance, exit, and junction.

4. The navigation device of claim 2, further comprising intersection displaying means for indicating with an arrow a next travelable direction starting from the intersection reached by scrolling.

5. The navigation device of claim 2, further comprising intersection displaying means for displaying on the screen a name of a next main road ahead connected to the intersection reached by scrolling.

6. The navigation device of claim 2, further comprising intersection displaying means for displaying on the screen names of next intersections on roads connected to the intersection reached by scrolling.

7. The navigation device of claim 2, wherein when at the intersection that joins a main road, the user repeats the setting of a scroll direction, the map image is scrolled along a road extending in the set direction from the intersection that joins a main road, and the scrolling is stopped again at an intersection that joins a next main road.

8. The navigation device of claim 2, wherein the main road is of a same class as or of a higher class than a collector road.

9. The navigation device of claim 5, wherein the scrolling means is a joystick, and wherein, by only tilting the joystick in a predetermined direction once, the map image is scrolled along a road on which one's vehicle is located, and the scrolling is automatically stopped at an intersection that joins a next main road.

10. A method for scrolling images displayed on a navigation device, comprising:
    providing a vehicle;
    providing a navigation device for use in the vehicle, said navigation device including a display operable to present map images;
    receiving a user-selected direction for scrolling of the map images on the display;
    identifying a direction of travel of the vehicle;
    identifying a road on which the vehicle is traveling;
    identifying a next main intersection with the road on which the vehicle is traveling; and
    scrolling the map images on the display in the user-selected direction until the next main intersection is reached.

11. The method of claim 10 further comprising the act of setting whether scrolling will stop at the next intersection.

* * * * *